United States Patent [19]

Haaker et al.

[11] Patent Number: 4,720,843
[45] Date of Patent: Jan. 19, 1988

[54] METHOD FOR SEPARATING MOVING STRUCTURES FROM A FIXED BACKGROUND IN A SEQUENCE OF X-RAY PROJECTION IMAGES AND EQUIPMENT FOR IMPLEMENTING THIS METHOD

[75] Inventors: Paul R. Haaker, Hamburg; Erhard P. A. Klotz, Halstenbek; Reiner H. Koppe, Hamburg; Rolf E. Linde, Haseldorf, all of Fed. Rep. of Germany

[73] Assignee: U.S. Philips Corporation, New York, N.Y.

[21] Appl. No.: 853,279

[22] Filed: Apr. 17, 1986

[30] Foreign Application Priority Data

Apr. 24, 1985 [DE] Fed. Rep. of Germany ....... 3514683

[51] Int. Cl.$^4$ .............................................. H05G 1/64
[52] U.S. Cl. ........................................ 378/99; 358/111
[58] Field of Search ........................... 378/99; 358/111

[56] References Cited

U.S. PATENT DOCUMENTS

| | | | |
|---|---|---|---|
| 4,335,427 | 6/1982 | Hunt et al. | 358/111 |
| 4,433,428 | 2/1984 | Haendle et al. | 378/99 |
| 4,436,095 | 3/1984 | Kruger | 378/99 |
| 4,581,635 | 4/1986 | Franke | 358/111 |

FOREIGN PATENT DOCUMENTS 0102592  3/1984  European Pat. Off. ............. 378/99

Primary Examiner—Craig E. Church
Assistant Examiner—John C. Freeman
Attorney, Agent, or Firm—Jack E. Haken

[57] ABSTRACT

The invention relates to an X-ray subtraction method, and equipment for implementing this method, in which a moving structure is subtracted from the fixed background. The picture values corresponding to the minimum absorption are used as the mask image for each picture element from the projection images.

5 Claims, 3 Drawing Figures

METHOD FOR SEPARATING MOVING STRUCTURES FROM A FIXED BACKGROUND IN A SEQUENCE OF X-RAY PROJECTION IMAGES AND EQUIPMENT FOR IMPLEMENTING THIS METHOD

The invention relates to a method for the separation of moving structures from the fixed background in a sequence of X-ray projection images of an object under examination, wherein a mask image assigned to the background, which is derived picture element by picture element from the picture values of projection images of the sequence, is subtracted from each projection image. The invention also relates to equipment for implementing such a method.

Such a method and such equipment can be used for example in the angiographic examination of coronary vessels. In this case a contrast medium is injected into the patient's coronary vessels. During a cardiac cycle, these vessels move as much as several centimetres against a background which for a few cardiac cycles can be assumed to be at rest or fixed. However, because this background moves over longer time intervals due, for example, to the patient's breathing, the conventional time-subtraction angiography with a blank exposure (mask), in which a projection image of the object before injection of the contrast medium is subtracted from a sequence of projection images of the same object taken after administration of the contrast medium, cannot be applied satisfactorily. In this case the required picture contrast is produced by a high dose of the contrast medium.

In the journal "Radiology", vol. 151, no. 2, pages 517 to 520 a method of the type mentioned in the preamble is described the aim of which is to eliminate this disadvantage. The mask image is produced in this case by taking a weighted mean of a number of projection images of the object (after the injection of a contrast medium). The coronary vessels themselves are quasi-blurred by their own movement against the background. The mask image thus obtained is then subtracted from the projection photographs. The mask image is disturbed in this case by the superimposed and obscured vessel structures. In the areas in which the vessels move only slightly, there are considerable disturbances because in this case the vessels are too little blurred so that their image after the subtraction is partially suppressed.

The aim of the present invention is to design a method of the type mentioned in the preamble so as to obtain an improved mask image.

The invention achieves this aim in the following way: to generate the mask image the picture values of several projection images are compared and the picture value corresponding to the minimum absorption forms the picture value for the particular picture element of the mask image.

Equipment for implementing the method with a radiation source and an image-recording device for the production of X-ray projection images and an image converter which converts the projection images into digital data words corresponding to the picture values contains, according to the invention, an extreme value decoder to which the data words assigned in each case to a picture element in different projection images are fed simultaneously or successively and the output of which delivers the data word which corresponds to the minimum absorption.

The invention is based on the idea that there is an appreciable contrast between the structures and the background and that the structures move against the fixed background and in so doing release this in individual phases, i.e. in individual projection images. If the background is not masked in a particular picture element by the moving structure, then the projection image in this picture element has the minimum absorption. If this procedure is used to find the picture values representing the lowest absorption for each picture element from different projection images and to reconstitute a picture from these picture elements, then a picture of the background is obtained. This picture is used as the mask image.

It should be mentioned at this point that a method is already known from DE-OS No. 32 37 572 in which a tomograph is formed from several individual images of an object by using the picture value, representing the minimum absorption, for each picture element from the individual images to form a tomograph. In this case, of course, moving structures are not separated from a fixed background in a sequence of images, but a tomograph of a fixed object is produced from individual images of different perspective.

The invention will be explained below with the aid of the drawings, in which.

Figure 1:
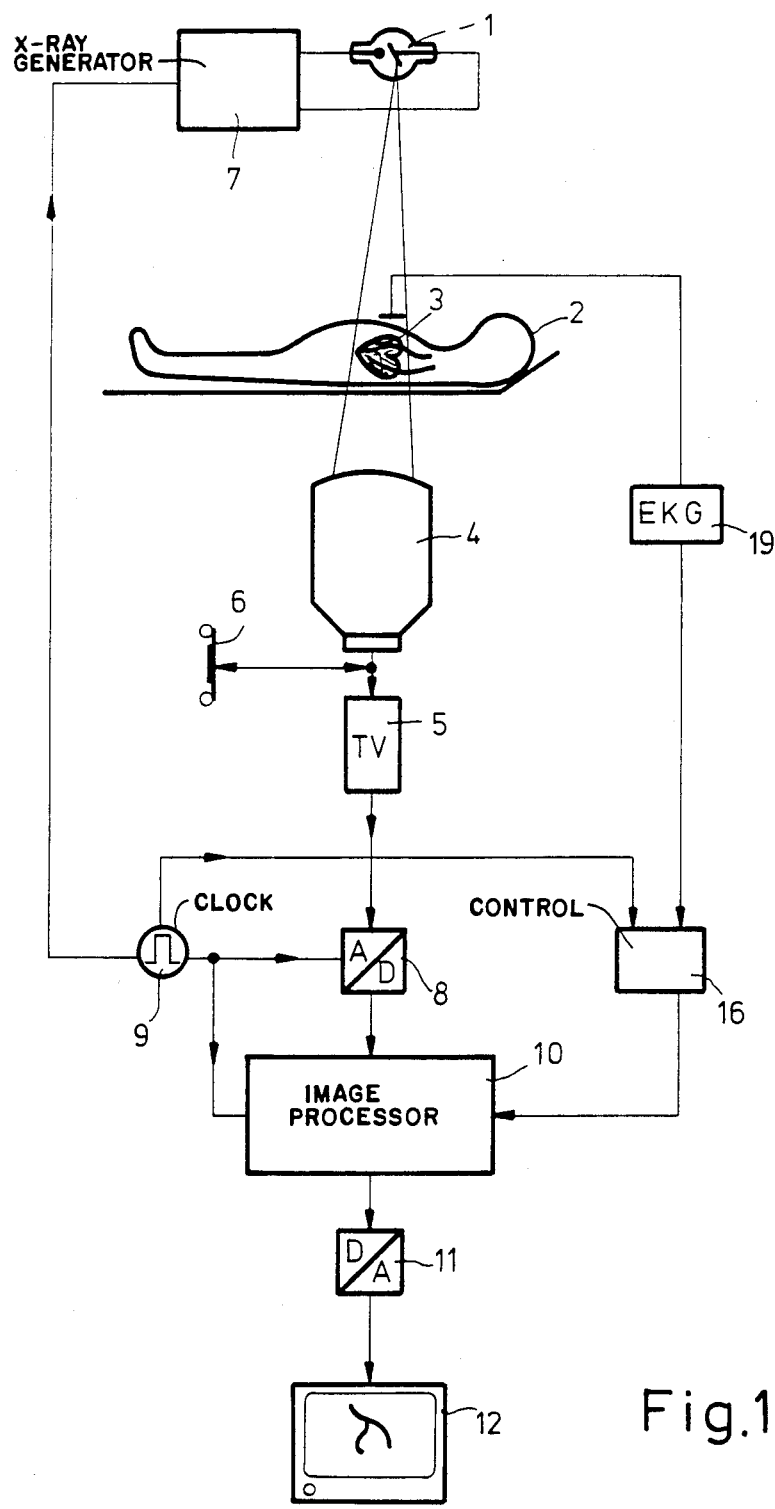
FIG. 1 is a schematic representation of a device for implementation of the method.

An X-ray source 1 produces a beam of rays which pass through a patient 2 whose coronary vessels have previously been injected with contrast medium. These moving structures inside the patient 2 are projected together with a (relatively) fixed background, the bones and soft parts of the patient, on to the input screen of an image intensifier 4. The output image of the image intensifier is converted by means of a television pick-up tube 5 into an electrical video signal. As is schematically indicated, the output image of the image intensifier can also be fed to a 35 mm cine-camera 6 by means of an image distributor (not illustrated).

The television signal is fed to an analog-digital converter 8. The clock pulses for the analog-digital converter 8 are supplied by a clock generator 9, but only in fact during the duration of the actual picture signal and a clock signal is not supplied during the horizontal and vertical flyback times. The clock generator also supplies synch. pulses for the television camera 5 and the X-ray generator 7 so that the X-ray tube emits radiation in bursts. At the output of the analog-digital converter 8, therefore, there appears a sequence of data words which represent the brightness values in adjacent picture elements. These brightness values are designated hereinafter as picture values. The picture values of the projection images are fed to an image processor unit 10 in which, on the one hand, a mask image is generated representing the background without the moving structures and, on the other, the mask image is subtracted each time from the projection images. The subtraction images produced in this way which then essentially represent only the moving structures are then fed via a digital-analog converter 11 to a picture display unit 12.

Figure 2:
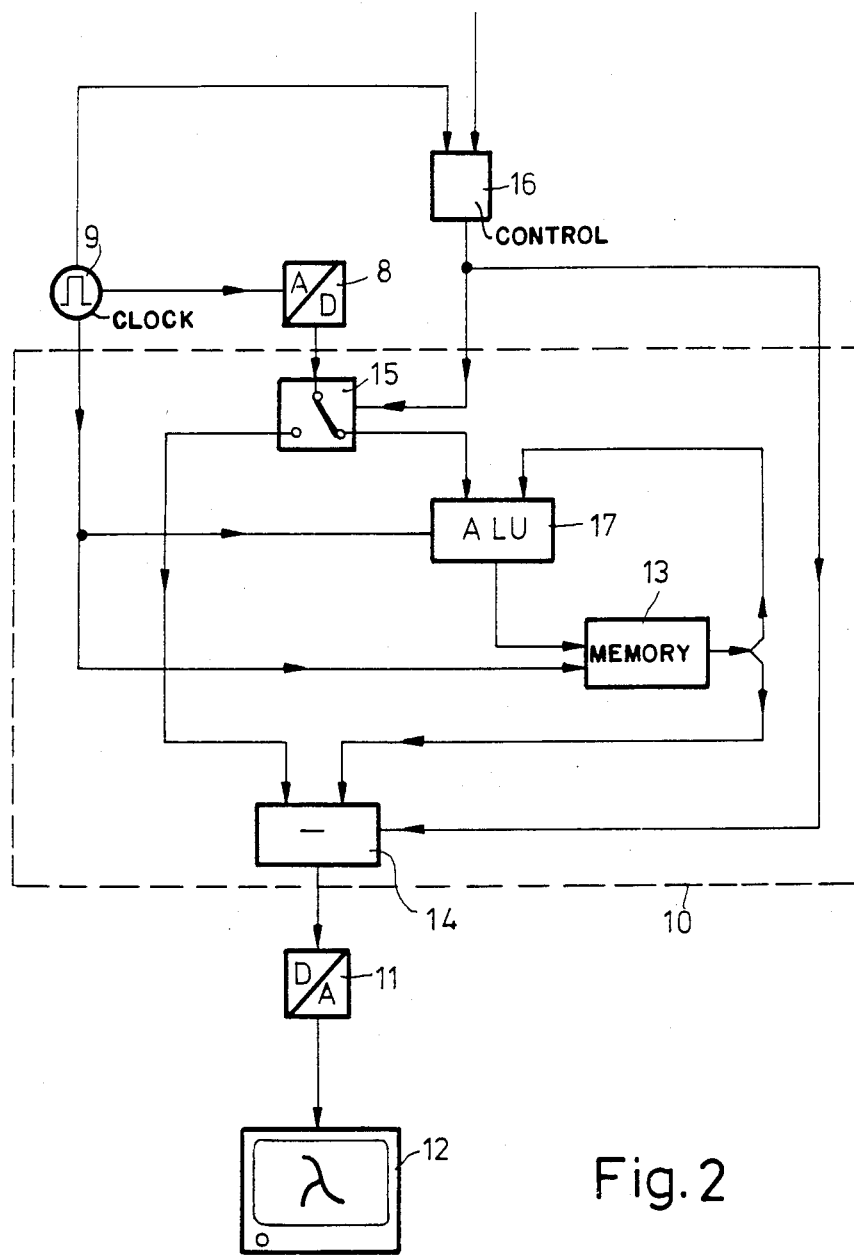
FIG. 2 is a part of this device.

As FIG. 2 shows, unit 10 contains a memory 13 the storage capacity of which is sufficient to accommodate the picture values of a projection image. In this memory are kept the picture values of a mask image representing the background of the projection images. Call-up of the picture values from the memory 13 is controlled, for example, by the clock generator 9 in such a way that in each case the picture value called up is the one allocated to the same picture element as the picture value just supplied by the analog-digital converter 8.

These two picture values are subtracted from one another in the subtracter circuit 14. Because the picture value supplied by the analog-digital converter 8 represents the absorption of the X-ray radiation both by the background and the moving structure (coronary vessels) in a particular picture element, while the picture value read out from the memory 13 represents only the absorption by the background in this picture element, the data word at the output of the subtracter circuit 14 represents the absorption by the moving structure in this picture element. Consequently, the display unit 12, which is connected to the output of the subtracter circuit by way of the digital-analog converter 11, displays only the moving structure (coronary vessels).

To produce a mask image, a switch 15 contained in unit 10 is moved into the position not illustrated in FIG. 2 by means of a control circuit 16; this takes place in fact at the start of the first projection image. This projection image is then loaded in full into the memory 13. It is then compared element by element in an arithmetic logic unit 17 with the next projection image in each case. For this purpose, one input of the arithmetic logic unit 17 is connected to the output of the analog-digital converter 8 and another input is connected to the output of the memory 13 so that the picture values of the image contained in store 13 are compared with the picture values of the respective projection image. The picture value representing the lower absorption of the two is assigned to the relevant picture element in store 13. If this is repeated for several projection images, store 13 will then contain the picture values which represent in each case the lowest absorption in the particular picture element. If it is assumed that in individual phases or projection images the moving structures cover the particular picture element but in others they do not, then the picture value stored for this picture element in store 13 represents the absorption of the X-ray radiation by the background alone so that ultimately the store 13 contains an image of the background which serves as the mask image.

It is not necessary to use all the projection images of a cardiac cycle in the manner described in order to produce a mask image. It is sufficient if only those projection images are used which show the moving structure in distinctly different phases of movement. Generally speaking, good mask images are obtained with no more than three to five projection images. These projection images are selected by means of an EKG trigger circuit 19 with which it is possible to detect in each case the heart action with the most rapid movements (systolic phase). The EKG signal obtained is delayed, for example, from the R-blip so as to come into the systolic phase in which the coronary vessels have the maximum movement. The size of the delay is dependent on the heart frequency. The delayed R-blip signal is then fed to the control circuit 16 (picture counter) which, in addition to switch 15, also controls the subtracter circuit. The mask image is derived from the projection images generated in this phase.

Figure 3:
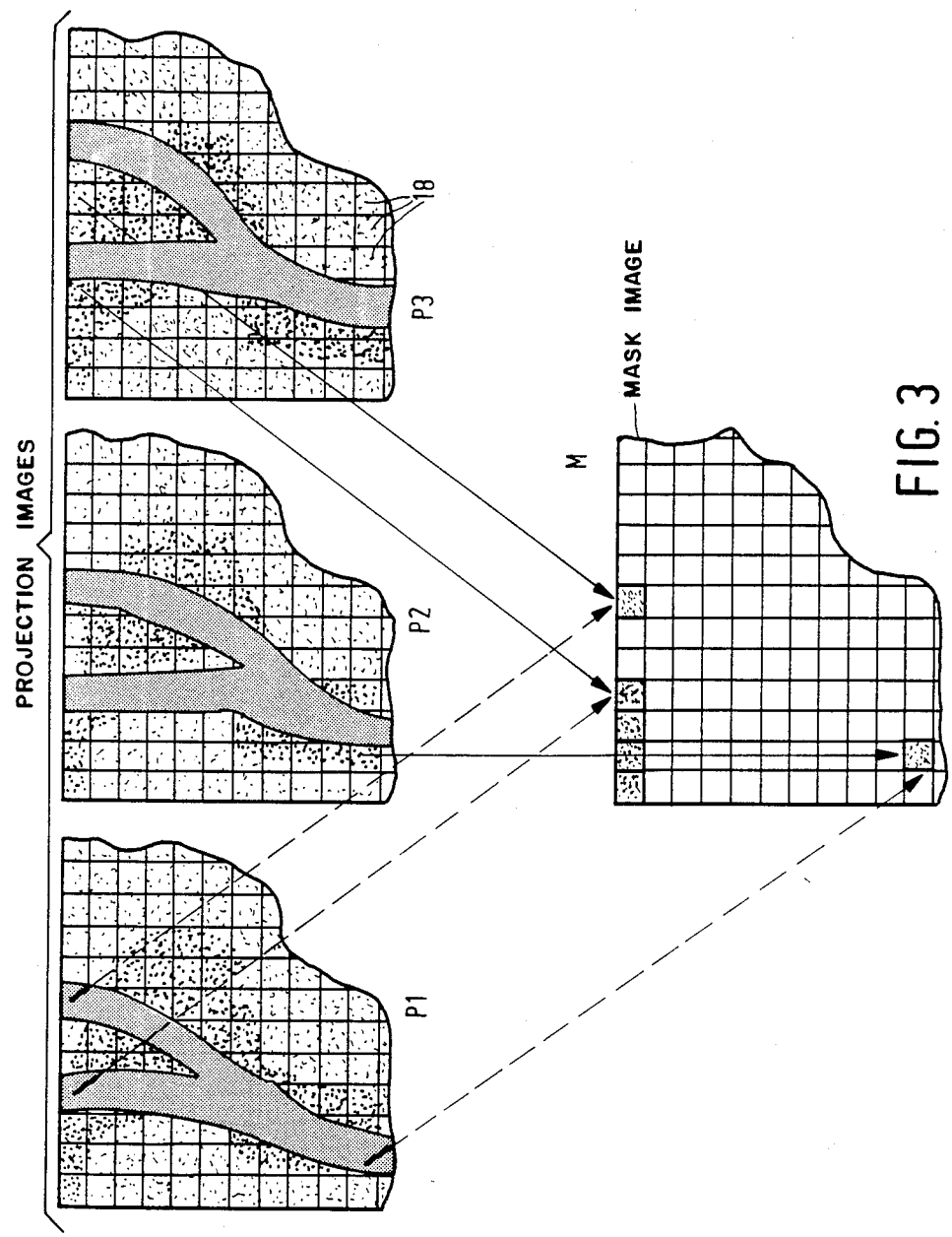
FIG. 3 shows different individual images and the mask image for the purpose of illustrating the method.

To illustrate the invention method, FIG. 3 shows the equivalent segments of three projection images P1, P2 and P3. Each projection image is made up of a plurality of square picture elements some of which are designated 18 in the case of P3. In addition, M represents an equivalent segment of the mask image. The first three picture elements of the first line of each projection image have approximately the same picture values so that in practice its noise or other forms of interference are the only things which determine from which of the projection images the picture values for the first three picture elements are taken. However, the situation is different in the case of the fourth picture element of the first line. This is masked in projection images P1 and P2 by a vessel filled with contrast medium which does not mask projection image P3 until the fifth picture element. As shown by the dash-line and solid arrows, which link the fourth picture element of the first line in the projection images with the corresponding picture element in the mask image, the picture element of the fourth picture element of projection image P3 is used for the mask image (solid arrow) because it represents the lowest absorption. In this way all the projection images are compared with each other picture element by picture element, and the picture value representing the minimum absorption is derived in each case for the mask image M. The mask image obtained as a result of this procedure essentially represents the fixed background therefore; in practice, the coronary vessels are no longer contained in the mask image. The mask image thus calculated is then subtracted from the projection images—and those of other cardiac cycles, too.

It has been assumed above that the background does not move during the recording of the projection images. This assumption is certainly valid for one or two cardiac cycles in the examination of coronary vessels, but the background does move where examination times are longer—as a result, for example, of the patient's breathing. Then it is no longer possible to get by with one mask image because the background has moved during the examination. It is necessary therefore to generate a new mask image at fixed time intervals—after one or two cardiac cycles for example. If a mask image is generated for each cardiac cycle, then this can be used for subtraction with the projection images of the next cardiac cycle. In this case two stores are used—one to store the mask image just used for the subtraction and the other to accommodate the mask image used subsequently. For this, one input of the arithmetic logic unit 17 would have to be permanently connected to the output of analog-digital converter 8.

The above description has assumed on-line processing in which the moving structure can be examined on the display unit 12, as it is being photographed by the radiographic equipment 1, 4 . . . 7. It is also possible, however, for a sequence of pictures already recorded by the cine-camera 6, for example, to be processed subsequently. For this purpose the single frames have only to be converted by a digitizer into data words corresponding to the picture values in the individual picture elements. The picture sequences can also be directly stored in digital form. When the entire picture sequence is available in stored form, the projection images of one cardiac cycle can be subtracted from the mask image produced from projection images of the same cardiac cycle. This is the ideal situation.

What is claimed is:

1. A method for X-ray examination comprising the steps of:
   obtaining a sequence of X-ray projection images of an area of a patient which depict moving structures against a fixed background;
   deriving a mask image from said sequence of images by comparing a group of images in said sequence, on a picture element-by-picture element basis, and choosing for each picture element in the mask image a corresponding picture element value from the plurality of images which represents a minimum absorption value; and
   subtracting the mask image from one or more images in said sequence.

2. A method as claimed in claim 1 for angiographic examination of coronary vessels further comprising disposing a contrast medium into a coronary vessel of said patient, where said area contains said coronary vessel, and wherein the step of obtaining a sequence of X-ray projection images comprising obtaining the images during a rapid cardiac phase under the control of EKG signals from said patient.

3. A method as claimed in claim 1 for angiographic examination of coronary vessels further comprising disposing a contrast medium into a coronary vessel of said patient, where said area contains said coronary vessel, and wherein the step of deriving the mask image is repeated several times using different groups of images in the sequence.

4. A method as claimed in ay of claims 1, 2, wherein a mask image derived from projection images obtained during a first cardiac cycle is subtracted from projection images obtained during subsequent cardiac cycles of said patient.

5. A method as claimed in any of claims 1, 2 or 3 wherein the mask image is derived from projection images in a single cardiac cycle of said patient and is subsequently subtracted from stored projection images which were obtained during the same cardiac cycle.

* * * * *